United States Patent [19]

Hladky et al.

[11] Patent Number: 5,069,054
[45] Date of Patent: Dec. 3, 1991

[54] ROLLING MACHINE WITH QUICK CHANGE WORKING ROLLS

[75] Inventors: Vaclav Hladky, Brno; Jiri Prokes, Rosice u Brna, both of Czechoslovakia

[73] Assignee: Form, Brno, Czechoslovakia

[21] Appl. No.: 399,897

[22] Filed: Aug. 29, 1989

[30] Foreign Application Priority Data

Aug. 31, 1988 [CS] Czechoslovakia .................. 5860-88

[51] Int. Cl.⁵ ............................................. B21B 35/14
[52] U.S. Cl. ........................................ 72/238; 72/249; 403/344; 464/182; 464/901
[58] Field of Search ................. 72/237, 238, 181, 249; 464/182, 901; 403/290, 344

[56] References Cited

U.S. PATENT DOCUMENTS

| | | | |
|---|---|---|---|
| 744,917 | 11/1903 | Houldsworth | 403/344 |
| 1,631,236 | 6/1927 | Werner | 464/901 |
| 3,703,113 | 11/1972 | Feisel | 403/344 |
| 3,744,577 | 7/1973 | Williams | 464/182 |
| 3,917,424 | 11/1975 | Zugel | 403/344 |
| 3,985,013 | 10/1976 | Pillon et al. | 72/238 |
| 4,368,633 | 1/1983 | Nosota | 72/238 |

Primary Examiner—Lowell A. Larson
Assistant Examiner—Thomas Schoeffler
Attorney, Agent, or Firm—Cohn, Powell & Hind

[57] ABSTRACT

The rolls of a rolling mill have working rolls which may be quickly changed, with the associated tools. The rolling machine has an angular trunnion, at least on one end of the working roll, supported in a divided clamping part of a driving shaft having a mating fixture. The other end of the working roll may have a circular trunnion or a non-circular trunnion removably supported by a guiding and supporting shaft.

9 Claims, 1 Drawing Sheet

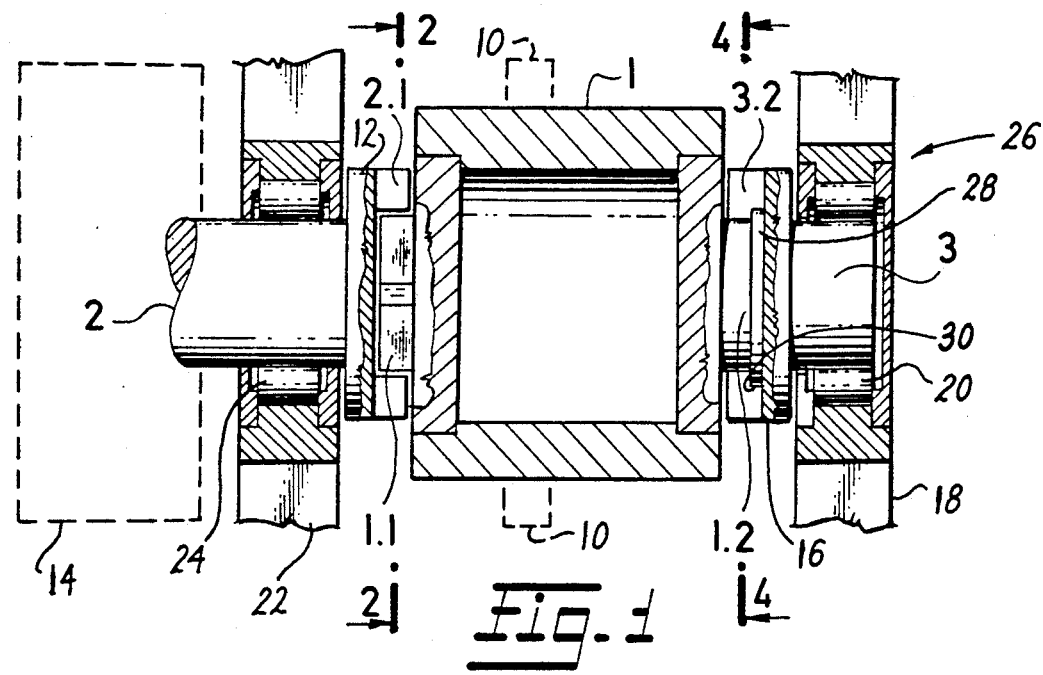
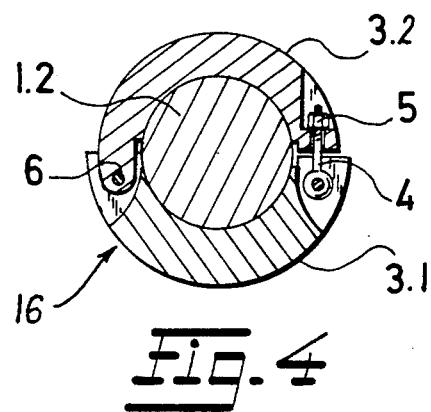
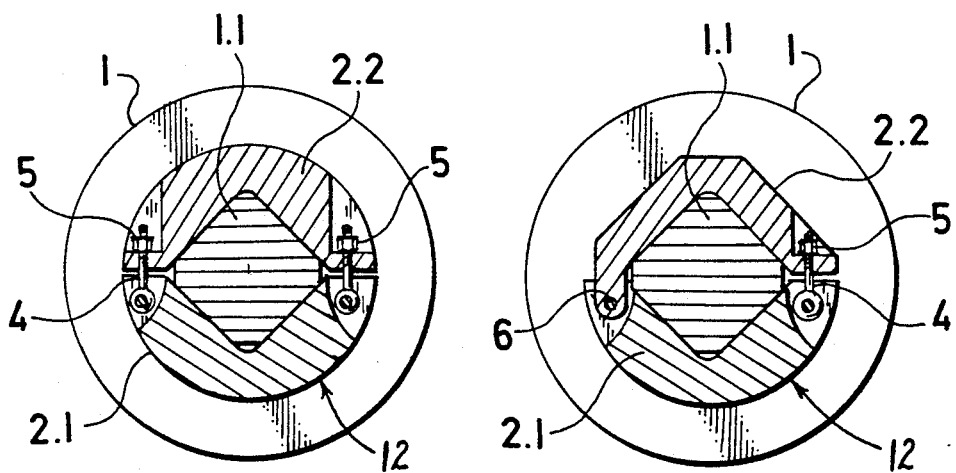

ROLLING MACHINE WITH QUICK CHANGE WORKING ROLLS

BACKGROUND OF THE INVENTION

The invention relates to a rolling machine of the type used for rolling mills to work and shape steel and other metals. A typical rolling machine has a driving mechanism with a driving shaft, a supporting and guiding mechanism with a supporting trunnion and exchangeable working rolls on which rolling tools are mounted.

Rolling machines of this kind are usually provided with two or three rolls firmly supported in a stand of the machine. The rolling machine usually has means for the rolls to be connected to stable, or fixed, compact shafts, such as stub shafts, of a driving mechanism. The driving mechanism may be a conventional power source, such as an electric motor and/or gear train. Tools of the desired shapes are clamped on the rolls. The installation of tools at the appropriate places on the rolls, and particularly their adjustment, exchange and replacement, is time consuming on conventional rolling machines. The typical rolling machine is thereby out of productive operation for considerable time during the down time necessary for adjustment, exchange and replacement of the rolls. Change of the rolling machine from one rolling program, having one kind of a rolling product, to another is thus substantially limited with conventional rolling machines. Another drawback with most conventional rolling machines is the requirement that each individual segment or element of the different tools must be installed at the correct location on the roll while the roll is in the rolling machine. The tools must also be removed from the working rolls individually and taken to the appropriate machine tool for repair and renovation.

Methods for exchange of tools simultaneously with the exchange of the working rolls have been tried. Known methods exchange the tools and rolls simultaneously, but require contemporaneous disassembly of the rolling machine to permit removal of several parts of the machine. The rolls are typically connected with heavy, fixed or compact shafts, such as drive shafts, which may be unitary with the rolls, which may be long, which may be journaled in inaccessable bearings, or enclosed by other parts, and which may be connected to complex gear trains. In addition, a shaft or shafts of the working rolls may be mounted in the frame of the rolling machine. Removal of the rolls from the machine, by prior methods, required a crane to life the rolls in a vertical direction with respect to the base of the machine, after first disassembling the rolls from the shafts, bearings, gear trains, frames and the like with which the rolls are associated. An exchange of working rolls by this method, requiring removal and return of the other machine parts, is time consuming and requires a large amount of labor so that a quick change of the rolling program, and a reduction of unproductive down time, is not possible.

SUMMARY OF THE INVENTION

An easy and quick exchange of working rolls, with associated tools, of a rolling machine is achieved, by applicants, by provision of an angular or non-circular trunnion on at least one end of the working roll. The non-circular trunnion is supported in a divided clamping part of the driving shaft having a complementary mating fixture. The other end of the working roll may have a circular or a non-circular trunnion or may be removably supported by a guiding and supporting shaft, e.g. a shaft journaled in a frame mounted bearing.

An advantage of the rolling machine according to this invention is the easy and quick exchange of working rolls with the associated tools. The removal and reassembly of working rolls can be accomplished by means of different, and simpler, lifting and handling devices after release of clamping elements, since only the rolls need be lifted. The associated frame parts, shafts, bearings and gear trains need not be disturbed. Another advantage is that the arrangement of working rolls with the associated tools may be repeatably interchanged for their subsequent operational utilization without repeated or readjustment of tool location on the rolls. When removed, the shape of tools can be renewed and the tools repaired or adjusted without disassembly from the rolls and the tools and rolls can be again inserted into the rolling machine without repeated adjustment or readjustment of the location of the tools on the rolls.

It is an object of this invention to eliminate to a substantial degree the mentioned drawbacks and to provide a rolling machine of this kind, where a working roll with tools can be simply, reliably and quickly exchanged for another one. According to one aspect of this invention the exchangeable working rolls with tools are provided on at least at one end with an angular trunnion situated in a divided clamping part connected to a driving shaft, whereby a stable or fixed part thereof is connected with a mobile or removable part by at least one threaded fastener, such as a nut and bolt or machine screw. While on the other end of the working roll, the trunnion can be of circular cross section, situated also in a divided clamping part of a supporting trunnion, whereby the stable or fixed clamping part is again connected with the mobile or removable one by at least one threaded fastener. It will be understood that fasteners equivalent to threaded fasteners, such as camming fasteners, may be used if desired. Both ends of the working roll can be of course also provided with angular or non-circular trunnions, if desired.

It is thus an object of this invention to provide a mechanism for quick changeover of the working rolls of a rolling machine.

It is a further object of this invention to provide a mechanism to permit the rolls of a rolling machine to be removed and installed without substantial disassembly and reassembly of the associated parts of the rolling machine.

It is a further object of this invention to reduce unproductive down time of a rolling machine on changeover of a rolling program.

It is a further object of this invention to reduce unproductive down time on removal and replacement of working rolls.

It is a further object of this invention to permit removal of working rolls and tools for replacement, adjustment and repair of the tools without disassembling the tools from the working rolls.

The invention may be further understood by reference to the following Description of the Drawings and Description of the Preferred Embodiments.

DESCRIPTION OF DRAWINGS

The invention will be more clearly described in the following drawings, where

FIG. 1 is a partial longitudinal cross-sectional view of a rolling machine mounting an exchangeable working roll, shown partially in schematic;

FIG. 2 is a partial cross-sectional view taken along the plane of line 2—2 in FIG. 1;

FIG. 3 is an alternative embodiment to that shown in FIG. 2, and

FIG. 4 is a partial cross-sectional view taken along the plane of line 4—4 in FIG. 1.

DESCRIPTION OF PREFERRED EMBODIMENTS

With reference to FIG. 1, an exchangeable working roll 1, in accordance with applicants' invention, with tools, shown schematically and in phantom at 10, is provided on one end with an angular trunnion 1.1 and on its other end with a circular trunnion 1.2. The angular trunnion 1.1 is mounted in a divided clamping part 12 of the driving shaft 2, which has a stable (fixed) part 2.1 and a mobile (removable) clamping part 2.2. The driving shaft 2 is connected to a driving mechanism of the machine 26, such as an electric motor and/or gear train shown schematically and in phantom at 14. The circular trunnion 1.2 of the exchangeable working roll 1 with tools 10 is also mounted in a divided clamping part 16 of a supporting trunnion or stub shaft 3, which has a stable clamping part 3.1 and a mobile clamping part 3.2. The compact or stub shaft 3 is part of a supporting and guiding mechanism, which also includes frame member 18 having bearing 20, as shown. Similarly, driving shaft 2 is mounted in frame member 22 having bearing 24, all part of rolling machine 26, as shown.

The connection of stable and mobile clamping parts 2.1 and 2.2 of the driving shaft 2 and the connection of the stable and mobile clamping parts 3.1 and 3.2 of the supporting trunnion or stub shaft 3 can be pivotally engaged by bolt 4 and a nut 5 and by a pin 6, or by means of two bolts 4 with nuts 5 as shown in both alternatives in FIG. 2 and FIG. 3 of the drawings. The arrangement of fasteners shown permit readily engageable and disengageable operative connections between the various elements of the rolling machine, as shown.

The removable working rolls 1 with tools 10 can be also provided on both ends with angular trunnions, such as element 1.1, and mating clamps. This configuration may permit roll 1 to be driven at either end, as desired.

In operation of the rolling machine 26 the exchangeable working rolls 1 with tools 10 are mounted in the divided clamping parts 2.1, 2.2 of the driving shaft 2 and in divided clamping parts 3.1, 3.2 of the guiding and supporting stub shaft or trunnion 3. Prior to removal of the exchangeable working roll 1 with tools 10 the nuts 5 are loosened and the mobile clamping part 2.2 of the driving shaft 2 and the mobile clamping part 3.2 of the supporting and guiding stub shaft or trunnion 3 are pivoted or removed from corresponding stable clamping parts 2.1 and 3.1. This operation is accomplished in a minimal amount of time, since the connections are readily accessble. Further no other significant disassembly is required to free the rolls 1 from clamping parts 2.1, 2.2 and 3.1, 3.2. The proper removal and disposition of exchangeable working rolls 1 with tools 10 is then readily accomplished by some conventional lifting mechanism, not shown, such as jacks, pulleys, cranes and the like. Reinstallation of the identical roll 1 or a different roll 1 is readily accomplished by reversing the procedure and resecuring clamping elements 2.1, 2.2 and 3.1, 3.2.

As further shown in the drawings, at FIGS. 1, 2 and 3, the cross-sectional configuration of driven trunnion 1.1 and its cooperating mating drive parts, e.g. clamping elements 2.1 and 2.2, is square or diamond shaped. This shape, or other non-circular configuration, provides the purchase by which drive shaft 2 can rotate working roll 1. As shown in FIGS. 1 and 4, the supporting trunnion 1.2, and its cooperating mating parts, e.g. clamping elements 3.1 and 3.2 may have a circular cross-section, as well as a non-circular or angular configuration, such as that shown in FIGS. 1, 2 and 3.

Either trunnion 1.1 or 1.2, and the mating clamping elements may be provided with an indexing structure, such as a cooperating flange and recess. An embodiment of an indexing structure is shown in FIG. 1. Trunnion 1.2 has a terminal flange 28, which mates in complementary recess 30 in clamping elements 3.1 and 3.2. The cooperation between flange 28 and recess 30 serves to properly locate roll 1 in rolling machine 26 by providing a fixed reference for the quick release mechanism.

The rolling machine 26 with quick change working rolls 1 with tools 10, according to this invention, is particularly suitable for the so called cross wedge rolling. The rolls 1 with tools 10 may be changed with a minimum of non-productive down time. The rolling machine 26 may be rapidly configured for changes in the rolling program by exchanging a roll 1 and tools 10 as installed in the rolling machine 26, for a subsequent set of roll 1 and tools 10, as required by a new rolling program. The changes are readily and rapidly accomplished by the operations described above.

It will be appreciated by those skilled in the art that modification of the embodiments described herein may be made without departing from the spirit of the invention disclosed. The embodiments given herein are for illustrative purposes only and not for purposes of limitation. The invention is not to be limited by the specifics of those embodiments, but only by the scope of the appended claims and their equivalents.

We claim:

1. A rolling machine with a quickly removable and replaceble working roll, the rolling machine having a driving mechanism provided with a driving shaft, a supporting and guiding mechanism provided with a supporting trunnion and a removable working roll for supporting tools, the removable working roll being provided at least at one end with an angular trunnion supported within a first divided clamping part, the first divided clamping part having a stable clamping portion and a mobile clamping portion, said mobile clamping portion of the first divided clamping part being removably connected with the stable clamping portion by at least one threaded fastener, the other end of the working roll having a trunnion also supported within a second divided clamping part, said second divided clamping part also having a stable clamping portion and a mobile clamping portion, the latter mobile clamping portion of the second divided clamping part being connected with the stable clamping portion by at least one threaded fastener.

2. A rolling machine as claimed in claim 1 wherein the working roll is provided at both ends with angular trunnions.

3. A rolling machine as claimed in claim 1 wherein the working roll has a non-circular trunnion at the other end.

4. A rolling machine as claimed in claim 1 wherein the working roll has a circular trunnion at the other end.

5. A rolling machine as claimed in claim 1 wherein the rolling machine includes means for indexing the location of the working roll in the rolling machine.

6. A rolling machine for metal working comprising a frame having spaced frame members and bearings mounted in the spaced frame members, the rolling machine having shafts mounted in the bearings and a roll supported within the spaced frame members by the shafts, the rolling machine having means for rotationally driving the roll, including means for rotationally driving a shaft supporting the roll, the roll having first and second axially extending trunnions extending along the rotational axis of the roll, one trunnion extending from each end of the roll, the first trunnion having a non-circular cross-sectional shape, the first trunnion being supported by the rotationally driven shaft, the first trunnion being connected to the rotationally driven shaft by a first clamp, the first clamp being formed on an end of the rotationally driven shaft, the first clamp having an internal cross-sectional shape complementary to the cross-sectional shape of the first trunnion and being matingly engageable therewith, the first clamp having a portion fixed to the rotationally driven shaft and a second portion removably connected thereto, the removably connected portion forming means for rapidly assembling and disassembling the first trunnion and roll to the rotationally driven shaft in the rolling machine, the roll and rotationally driven shaft being in a cooperating relationship whereby the rotationally driven shaft supports and rotates the roll, the removably connected portion of the first clamp including fastener means for engageably and disengageably joining the removably connected portion of the first clamp to the fixed portion of the first clamp; the second trunnion being supported by a shaft, the second trunnion being attached to the supporting shaft by a second clamp, the second clamp being formed on an end of the supporting shaft, the second clamp having a cross-sectional shape complementary to the cross-sectional shape of the second trunnion and being matingly engagable therewith, the second clamp having a portion fixed to the supporting shaft and a second portion removably attached thereto, the removably attached portion forming means for rapidly assembling and disassembling the second trunnion and roll to the supporting shaft in the rolling machine, the roll and supporting shaft being in a cooperating relationship whereby the supporting shaft supports the roll when the roll is rotated by the rotationally driven shaft, the removably attached portion of the second clamp including fastener means for engageably and disengageably joining the removably attached portion of the second clamp to the fixed portion of the second clamp, the rapidly assembling and disassembling means of the first and second clamps forming means for quickly removing and replacing the roll in the rolling machine with a subsequent roll with a minimum of non-productive down time.

7. The rolling machine of claim 6 wherein the second trunnion has a circular cross-section.

8. The rolling machine of claim 6 wherein the second trunnion has an angular cross-section.

9. The rolling machine of claim 6 wherein the first trunnion has a square cross-section.

* * * * *